United States Patent [19]

Jacoby et al.

[11] 4,004,423
[45] Jan. 25, 1977

[54] PACKAGE AND KIT FOR INSTALLATION OF MASTER CYLINDER INTERNAL PARTS

[75] Inventors: Gerald B. Jacoby, Dayton; Thomas P. Mathues, Miamisburg, both of Ohio

[73] Assignee: General Motors Corporation, Detroit, Mich.

[22] Filed: Apr. 19, 1976

[21] Appl. No.: 678,142

[52] U.S. Cl. .................................. 60/533; 60/534; 92/128
[51] Int. Cl.² .......................................... F15B 7/08
[58] Field of Search ..... 60/458, 533, 534, DIG. 10; 92/128

[56] References Cited

UNITED STATES PATENTS

| | | | |
|---|---|---|---|
| 2,759,329 | 8/1956 | Ponti | 92/128 X |
| 3,309,400 | 6/1962 | Trent | 92/128 |

*Primary Examiner*—Edgar W. Geoghegan
*Attorney, Agent, or Firm*—D. D. McGraw

[57] ABSTRACT

The pistons, valves and failure warning switch mechanism contained within the bore of a master cylinder are preassembled in a container in kit form. The container provides for correct orientation of the parts in the master cylinder bore so that the failure warning switch actuating mechanism is properly aligned with the failure warning switch. The container is a tube of suitable material having a bore with the various internal parts of the master cylinder preassembled in it. Folding locating arms are attached near the forward end of the tube and normally held in a folded position by a cap and plug which closes the forward tube end. When the kit is ready to be used, the cap and plug are removed, the arms are unfolded, and the arm ends are aligned so that they extend through the bolt holes in the mounting ears of the master cylinder body. The tube bore is in alignment with the rear end of the master cylinder bore. The internal parts are then pushed out of the tube by a push rod and pass directly into the master cylinder bore. The parts may include a retainer which snaps into place to hold the parts in the bore when they are fully inserted. The warning switch can then be installed, as well as any retaining pins which may be required. The kit container is removed and may be discarded.

3 Claims, 4 Drawing Figures

PACKAGE AND KIT FOR INSTALLATION OF MASTER CYLINDER INTERNAL PARTS

The invention relates to a prepackaged kit for installing the internal parts of a master cylinder assembly in a master cylinder bore, and particularly includes an arrangement wherein the parts are aligned arcuately so that some of the parts cooperate with other mechanisms such as a warning switch when properly aligned. The kit includes a container body of generally tubular form with open ends. The primary and secondary master cylinder pistons, seals, and springs are assembled through one end of the tube, the other end having a radially inwardly extending lip providing a stop for the rear end of the parts. After the parts are installed in proper alignment, both axially and radially, a cap and plug is inserted in the end through which the parts were installed. The container body has locating arms attached thereto and held in a folded position by a portion of the cap during storage and shipment of the kit. When the kit is to be used, the cap and plug section is removed. The arms are unfolded and inserted through the bolt holes formed in the mounting ears of the master cylinder body. The tube bore is axially aligned with the master cylinder bore so that the parts may be easily transferred from the container bore to the master cylinder body. The parts are pushed through the container bore by a push rod extending through the container end having the lip formed thereon. When the pistons, seals and springs are fully inserted in the master cylinder bore and the retainer for them is in position, the container body with its locating arms is removed.

The container body may have the locating arms so attached that during storage they extend a short distance radially but in a folded relation, with their outer ends fitting under the rim section of the cap and plug. Alternatively, the arms may be so attached that they fold flat against the tubular container body and then extend to a point adjacent the open end so that the arms are held folded by the cap rim section. It will be advantageous to make the container tubular section of a clear material so that the parts can be readily seen, thereby assuring the installer that the parts are in proper arcuate alignment before installation.

IN THE DRAWINGS

Figure 1:
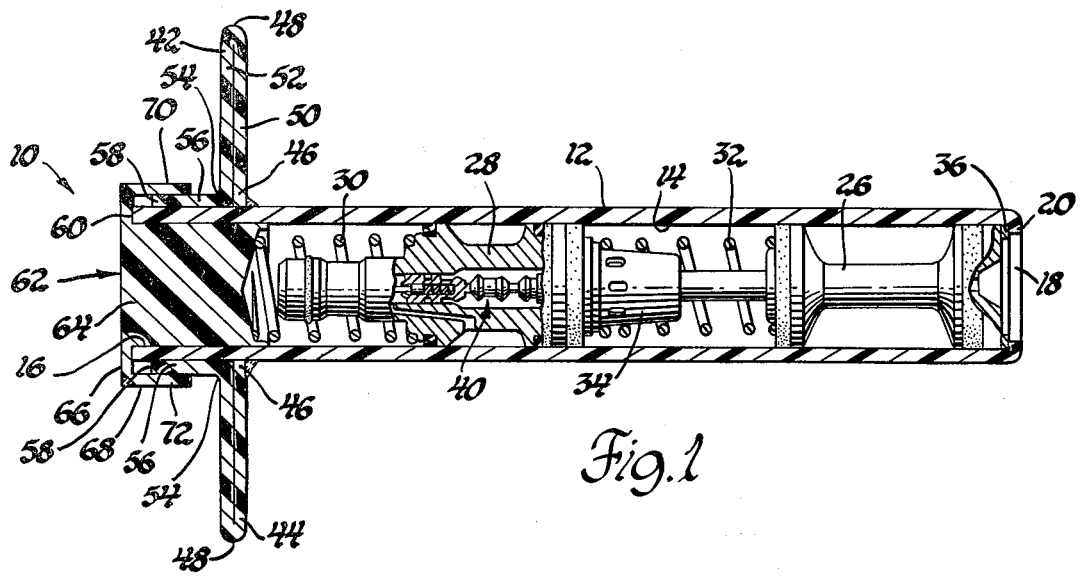
FIG. 1 is a cross-section view of a kit embodying the invention, illustrating the kit with the master cylinder parts installed in it, and the arms in the storage position.
Figure 2:
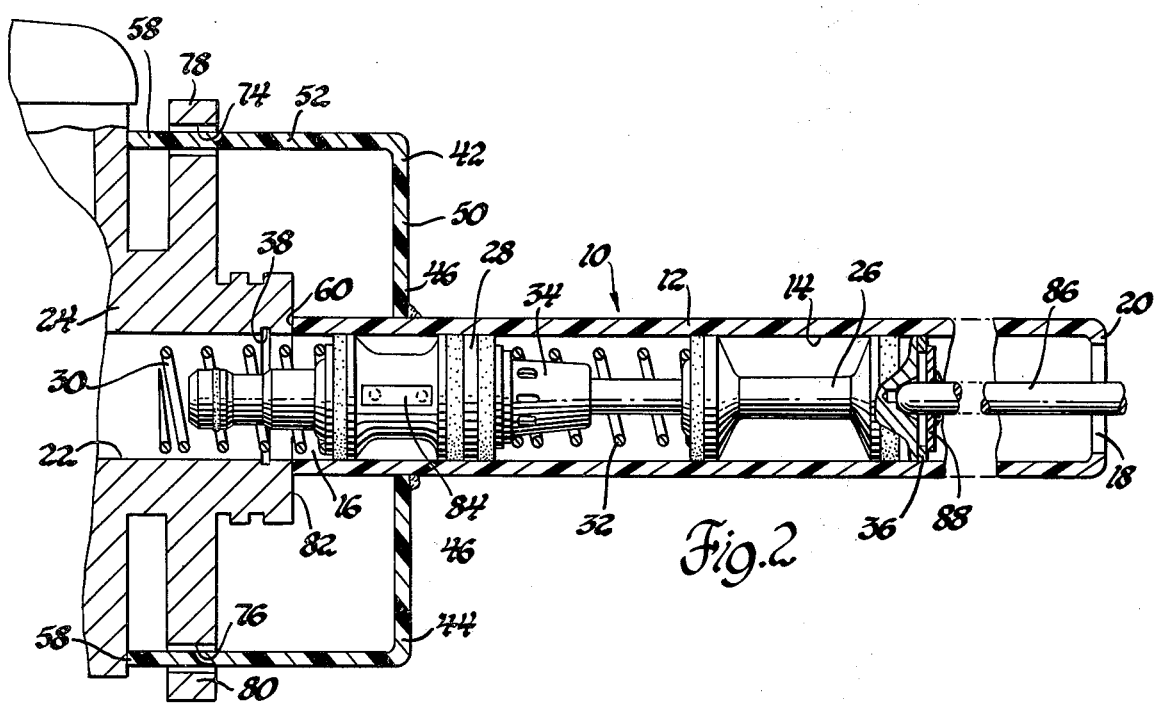
FIG. 2 is a cross-section view similar to FIG. 1 but showing the kit in position on a master cylinder body with the master cylinder internal parts being inserted in the master cylinder bore.

The kit 10 of FIGS. 1 and 2 has a tubular body section 12 defining a bore 14. The bore has open ends 16 and 18, with open end 18 being formed with a radially inwardly extending lip 20 providing a stop means. The diameter of bore 14 is the same diameter as the bore 22 of the master cylinder body 24 in which the internal master cylinder parts contained in the container are to be installed. The internal parts are illustrated as including a primary piston assembly 26, a secondary piston assembly 28, a secondary piston return spring 30, a primary piston return spring 32 and its associated retainer 34, suitable piston seals, and a snap ring retainer 36. This retainer is fitted in bore 14 so that it engages the lip 20 and the rear end of primary piston assembly 26. The snap ring is compressed radially while it is in the tube 12 and is arranged to snap outwardly into a retainer groove 38 in the rear end of the master cylinder bore 22 when the parts have been fully inserted in the master cylinder body.

The secondary piston assembly 28 is illustrated as having a failure warning switch piston assembly 40 positioned internally of the secondary piston. This assembly may be of the type shown in U.S. Pat. No. 3,938,333, entitled "Master Cylinder" and assigned to the common assignee. It is important to have the actuator bar 84 of the failure warning mechanism 40 arcuately aligned so that it is able to engage and actuate a failure warning switch installed in the master cylinder body and having a plunger extending slightly into the master cylinder bore 22. For this reason it is important to have the secondary piston assembly 28 arcuately positioned for proper installation.

Figure 4:
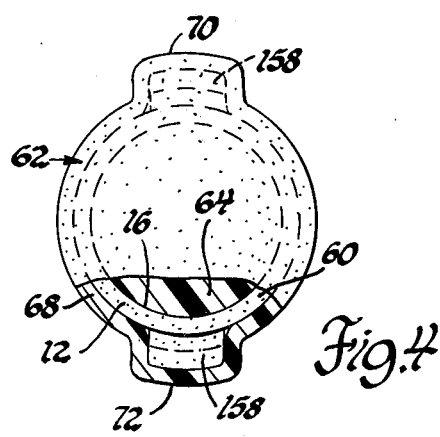
FIG. 4 is an end view of the kit of FIG. 3, taken in the direction of arrows 4—4 of that Figure, and having parts broken away and in section.

The container also includes suitable locating arms 42 and 44. The kit is illustrated as having two such arms which are positioned in diametrically opposite relation on the tubular body section 12. They may have non-symmetrical positions on body section 12. It is considered to be within the scope of the invention to provide the number of arms needed in order to have them cooperate with the master cylinder body to align the tubular body section 12 for installation. Arms 42 and 44 each have an end 46 which is secured to the outer surface of body section 12 adjacent the bore open end 16 but axially spaced a short distance from that end. When in its storage position, each arm extends radially outward and then is folded at 48 so that it extends radially inward. Thus the arm portions 50 and 52, on either side of fold 48, lie parallel to each other. Each arm is then folded at approximately right angles at point 54 so that each arm portion 56 terminating with the arm other end 58 lies axially parallel to and in surface engagement with the tubular body section 12. Each arm end 58 extends toward the end 60 of the body section 12 through which the bore open end 16 is formed. A cap 62 has a plug section 64 which extends into and closes bore open end 16. It also provides a spring seat for the forward end of return spring 30, axially loading springs 30 and 32, as well as piston assemblies 26 and 28, so that the master cylinder internal parts are held in the position in which they are inserted in the body section 12. Cap 62 has a cover section 66 extending radially outward so that it abuts the tubular body end 60. It also has a rim section 68 which surrounds the outer portion of the tubular body section 12 adjacent its end 60. As is better shown in FIG. 4, the cap rim section 68 has portions 70 and 72 positioned radially outward of the outer surface of body section 12 so that the locating arm outer ends are secured between the rim section and the body section and held in place. This keeps the locating arms in the folded position during storage.

When the master cylinder internal parts are to be installed, cap 62 is removed and locating arms 42 and 44 are unfolded to the position shown in FIG. 2. The arm ends 58 are inserted through the bolt holes 74 and 76 formed in the master cylinder body mounting ears 78 and 80. The assembly is then moved forwardly until the tubular body end 60 engages the rear end 82 of the master cylinder body 24 with the container bore 14 in axial alignment with the master cylinder body bore 22. It can be seen that the arms 42 and 44 arcuately locate the kit prior to assembly in relation to the master cylinder body. If the arms happen to be diametrically opposite, a suitable label may be provided on arm 42, for example, informing the installer that this arm is to be the upper arm. If the mounting ears of the master cylinder body, and therefore the locating arms of the kit, are so positioned that only one position will permit the arms to extend through the bolt holes, such labeling is not necessary but may be desirable. A further indication that the parts are in proper orientation for installation is available when the tubular body section 12 is of clear plastic. In this condition the installer can see the position of the actuator bar 84 in the secondary piston assembly 28 and readily determine that it is in arcuate alignment with the master cylinder body opening through which a failure warning switch is to be installed. The body may be suitably marked to show where the actuator bar should be located, if desired.

When the kit is in proper alignment, a tool 86 is inserted through the kit open end 18 and engages the primary piston assembly 26. Tool 86 is then operated to push the master cylinder internal parts axially out of the bore 14 and into bore 22. Snap ring retainer 36 fits in retainer groove 38 and holds the parts in position in bore 22. The kit container is then removed and may be discarded. When the snap ring retainer 36 is installed with the other master cylinder parts, tool 86 has a flange 88 on it which can pass through lip 20 but engage the retainer 36 to move it forwardly with the other parts. In some instances, retainer 36 may not be supplied in the kit in a preassembled position. Instead, it may be made available so that it can be inserted in groove 38 after the parts are positioned in bore 22 and before tool 86 releases the parts. This can be accomplished by providing tool 86 of sufficient length to slide the container body away from the master cylinder body before the tool is removed, and inserting the snap ring retainer 36.

Figure 3:
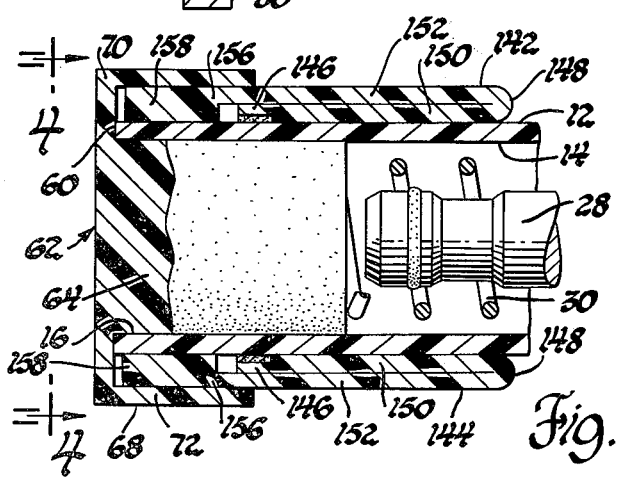
FIG. 3 is a cross-section view of one end of a kit showing a modified arrangement of the locating arms in their storage position.

The modification illustrated in FIG. 3 has locating arms 142 and 144 with their ends 146 secured to the tubular body section 12 adjacent end 60. The arm portions 150 are folded to lie against the tubular body section in a direction away from end 60. The arms are folded at 148 so that the arm portions 152 extend toward end 60 and lie against arm portions 150. The arm portions 156, which lie between arm ends 146 and body section end 12, are made slightly thicker so that when they pass arm ends 146 they touch the outer surface of body section 12 adjacent end 60 without further bending. Thus the arm outer ends 158 are stored immediately adjacent the body section end 60. The cap 62 is installed as before, with the plug section 64 closing bore open end 16 and the rim section 68 having its portions 70 and 72 holding the locating arms in their folded or stored positions illustrated in FIG. 3. The arms may be unfolded so that when the assembly is prepared for installation it operates in the same manner as shown in FIG. 2.

What is claimed is:
1. A prepackaged repair kit cooperable with the bore and mounting ears of a master cylinder body, said kit comprising:

a container body for holding and facilitating insertion of a plurality of interrelated and prepositioned parts in the master cylinder body bore and having a container bore with first and second body open ends, said first open end having stop means therein for axially holding the interrelated and prepositioned parts within said container bore relative to said first open end;

a plurality of selectively extendible locating arms having first ends fixed to said container body adjacent to but axially spaced from said second open end, and second ends positioned, when said arms are extended, axially beyond and laterally spaced from said second open end and adapted to mate selectively with bolt holes in the master cylinder body mounting ears to align said container body in an inserting position adjacent the master cylinder body bore whereby the interrelated and prepositioned parts which are prepackaged in said container bore may be pushed out of the container body through said second open end inserted into the master cylinder body bore;

said locating arms having a folded position in which at least portions thereof lie closely adjacent said container body with said second ends being intermediate the container body open ends and extending toward said body second open end;

and a removable cap having a rim fitting over said container body second open end and embracing at least part of said locating arms when in their folded position, said cap while fitted over said container body closing said second open end and retaining said locating arms in their folded positions.

2. A container for holding a plurality of interrelated parts and for facilitating assembly of the parts in a bore in a housing provided with a plurality of locating apertures positioned diametrically and circumferentially relative to the bore into which the parts are to be assembled by insertion, said container comprising:

a container body having a tubular bore with first and second open ends, and stop means in said first open end for axially holding the parts within said tubular bore relative to said first open end;

a plurality of selectively axially and laterally extendible locating arms fixed to said container body adjacent to but axially spaced from said second open end, said arms having a folded position wherein at least portions thereof lie immediately adjacent and axially parallel to said container body with all arm portions positioned axially intermediate said open ends, and having an extended position wherein they have free ends spaced laterally from and extending axially beyond said second open end for insertion in the housing locating apertures to position said container body tubular bore in axial alignment with the bore in which the parts are to be inserted and when appropriate to also position said container body tubular bore in circumferential alignment with the bore in which the parts are to be inserted.

3. A package for holding a plurality of interrelated and prepositioned parts and facilitating oriented assembly of the parts in the bore of a housing so that the parts become a functional part of an assembly including the housing, said package comprising:

a tubular body having a bore extending therethrough and provided with first and second open ends, said first open end having stop means therein for axially retaining the parts within said bore relative to said first open end;

a plurality of selectively axially extendible locating arms fixed to said tubular body adjacent to but axially spaced from said second open end, said arms having first portions extendible laterally from said tubular body, second portions of greater length than said first portions and when in the axially extended position being axially parallel to and laterally spaced from said tubular body and having ends adapted to mate selectively with locating apertures in the housing and associated with the housing bore to axially and arcuately locate and align the tubular body bore with the housing bore whereby the parts may be pushed out of the tubular body through said second open end for insertion into the housing bore, said locating arm second portions having a folded position in which they are reversely bent relative to said arm first portions to lie in juxtaposed relation to said arm first portions along the length of said arm first portions, said arm second portion ends lying adjacent to and axially parallel to said tubular body while extending toward said second open end while said arm second portions are in said folded position;

and a removable cap having a rim fitting over said tubular body second open end and embracing at least a part of said arm second portions when in their folded position, said cap while fitted over said tubular body closing said second open end and retaining said arm second portions in their folded positions.

* * * * *

UNITED STATES PATENT AND TRADEMARK OFFICE
CERTIFICATE OF CORRECTION

PATENT NO. : 4,004,423
DATED : January 25, 1977
INVENTOR(S) : Gerald B. Jacoby, Thomas P. Mathues It is certified that error appears in the above–identified patent and that said Letters Patent are hereby corrected as shown below:

Column 4, line 21, after "end" insert -- and --.

Signed and Sealed this

Twenty-eighth Day of June 1977

[SEAL]

Attest:

RUTH C. MASON
Attesting Officer

C. MARSHALL DANN
Commissioner of Patents and Trademarks